US008186938B2

(12) United States Patent
Young et al.

(10) Patent No.: US 8,186,938 B2
(45) Date of Patent: May 29, 2012

(54) TURBINE APPARATUS

(75) Inventors: Colin Young, Derby (GB); Guy David Snowsill, Derby (GB); Paul William Ferra, Derby (GB); Clive Peter Gravett, West Midlands (GB)

(73) Assignee: Rolls-Royce PLC (GB)

( * ) Notice: Subject to any disclaimer, the term of this patent is extended or adjusted under 35 U.S.C. 154(b) by 775 days.

(21) Appl. No.: 12/264,585

(22) Filed: Nov. 4, 2008

(65) Prior Publication Data

US 2009/0129916 A1 May 21, 2009

(30) Foreign Application Priority Data

Nov. 19, 2007 (GB) .................................. 0722511.3

(51) Int. Cl.
*F02C 7/18* (2006.01)

(52) U.S. Cl. ..... 415/115; 415/113; 415/145; 415/173.1; 415/173.7

(58) Field of Classification Search .................. 415/113, 415/115, 145, 173.1, 173.7
See application file for complete search history.

(56) References Cited

U.S. PATENT DOCUMENTS 7,445,424 B1 * 11/2008 Ebert et al. .................... 415/113
2002/0187046 A1 12/2002 Beutin et al.

FOREIGN PATENT DOCUMENTS

GB 2426289 11/2006

* cited by examiner

*Primary Examiner* — Edward Wojciechowicz
(74) *Attorney, Agent, or Firm* — McCormick, Paulding & Huber LLP

(57) ABSTRACT

A gas turbine engine comprising a rotor and a stator which define first, second and third cavities; the rotor and stator define a seal therebetween and which is located for sealing between the second and third cavities, the rotor comprises an aperture through which a gas flow passes from the first cavity to the second cavity characterized in that the seal comprises a deflector that extends axially over at least a portion of the aperture to deflect at least a part of the gas towards the rotor.

15 Claims, 2 Drawing Sheets

TURBINE APPARATUS

CROSS REFERENCE TO RELATED APPLICATION

This application is entitled to the benefit of British Patent Application No. GB 0722511.3, filed on Nov. 19, 2007.

FIELD OF THE INVENTION

The present invention relates to a turbine rotor-stator cavity cooling flow delivery system of a gas turbine engine.

BACKGROUND OF THE INVENTION

The turbines of gas turbine engines operate at very high temperatures and it is critical to ensure that components are adequately cooled. The turbines comprise complex cooling arrangements to ensure components are adequately cooled, but this requires parasitic cooling air that compromises engine efficiency. It is therefore desirable to use cooling air in the most efficacious manner possible.

SUMMARY OF THE INVENTION

In accordance with the present invention a gas turbine engine comprising a rotor and a stator which define first, second and third cavities; the rotor and stator define a seal therebetween and which is located for sealing between the second and third cavities, the rotor comprises an aperture through which a gas flow passes from the first cavity to the second cavity characterized in that the seal comprises a flow control feature that extends axially over at least a portion of the aperture to deflect at least a part of the gas towards the rotor.

Preferably, the seal comprises a rotating part and a static part and the rotating part comprises the flow control feature. Alternatively, the static part comprises the flow control feature.

Preferably, the flow control feature is annular.

Preferably, the flow control feature comprises an angled surface upon which the gas impinges.

Preferably, the angle of the surface is about 30 degrees, but may be between 15 and 45 degrees.

Alternatively, the surface is arcuate.

Preferably, the gas passes through the aperture in a radial direction and the flow control feature is arranged to impart an axial component of velocity to the gas flow.

Preferably, the rotor comprises a seal plate to which the deflected gases flow is directed.

Preferably, the rotor comprises a drive arm that defines an annular array of apertures.

DETAILED DESCRIPTION OF THE PREFERRED EMBODIMENTS

Figure 1:
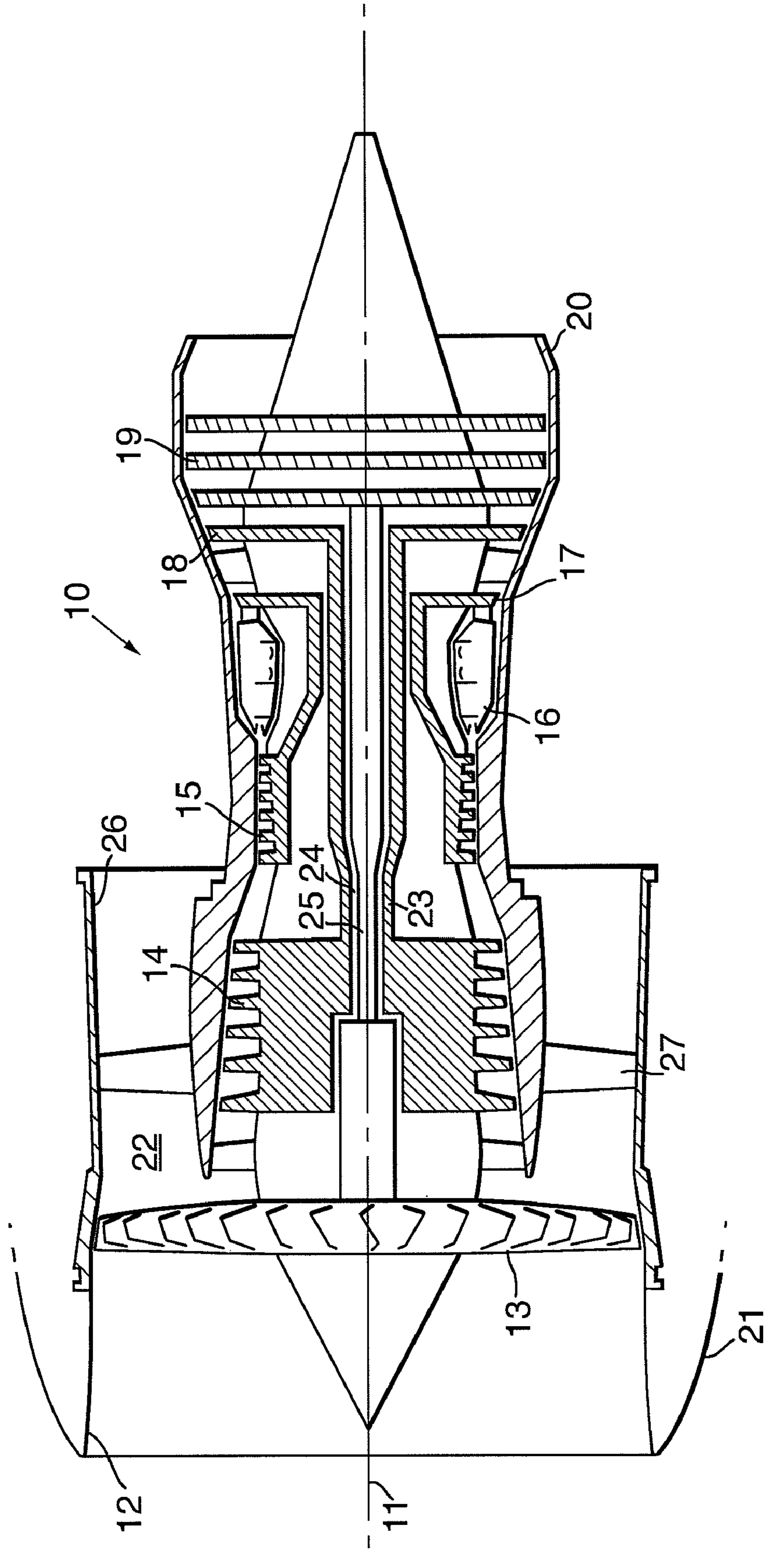
FIG. 1 is a schematic section of part of a ducted fan gas turbine engine incorporating the present invention.

With reference to FIG. 1, a ducted fan gas turbine engine generally indicated at 10 has a principal and rotational axis

11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle. A nacelle 21 generally surrounds the engine 10 and defines both the intake 12 and the exhaust nozzle.

The gas turbine engine 10 works in the conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 23, 24, 25.

The fan 13 is circumferentially surrounded by a structural member in the form of a fan casing 26, which is supported by an annular array of outlet guide vanes 27.

Figure 2:
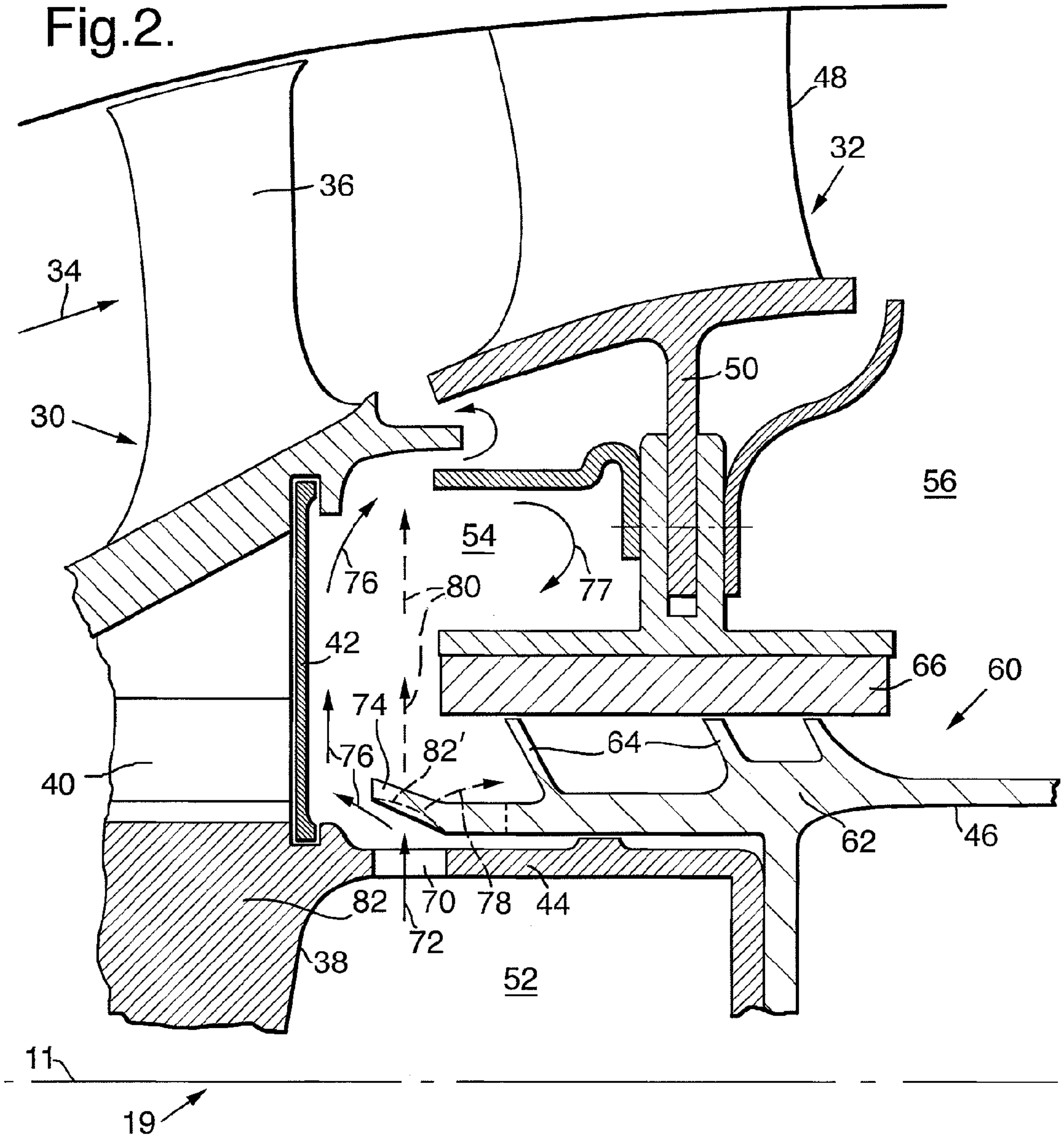
FIG. 2 is a section through part of a turbine of the gas turbine engine incorporating a flow control feature in accordance with the present invention.
Figure 2A:
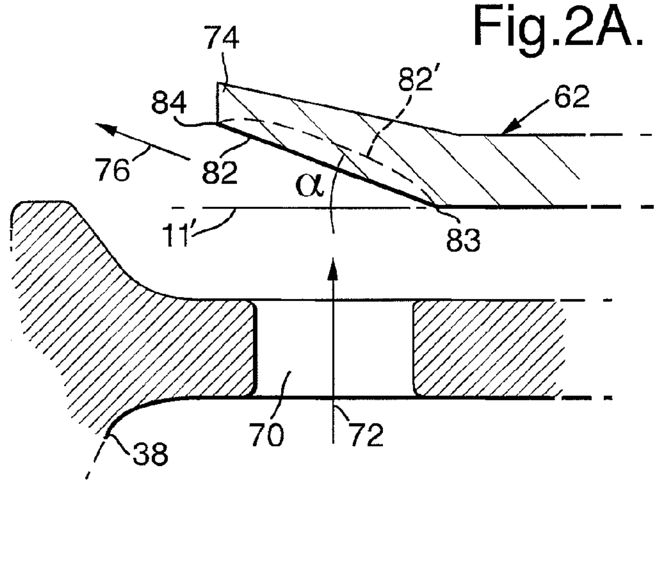
FIG. 2A is an enlarged view of the flow control feature shown in FIG. 2.

Referring now to FIGS. 2 and 2A the turbine 19 comprises interspaced stators 32 and rotors 30 which extract work from a main working gas flow 34. The rotor 30 comprises an annular array of radially extending blades 36 supported on a rotating member 38 via a fixture 40. The fixture 40 may commonly be a dovetail fixture and is sealed, via a seal plate 42, to prevent ingestion of undesirable gas flows. An annular drive arm 44 extends from the rotating member 38 and is connected to another rotor member's drive arm 46. The stator 32 comprises an annular array of radially extending vanes 48 supported from static member 50. A first cavity 52 is partly defined radially inwardly of the drive arm 44; a second cavity 54 is partly defined by the rotor 30 and stator 32 and a third cavity 56 is partly defined radially outwardly of the drive arm 46.

The stator 32 and rotor 30 define a seal 60 therebetween that seals the second and third cavities 54, 56. The seal 60 comprises a labyrinth seal where the rotating part 62 comprises a number of fins 64 that seal against a static seal part 66. In use, a relatively small amount of gas can pass through the seal usually from the second cavity 54 to the third cavity 56 to provide cooling thereto.

The drive arm 44 comprises an annular array of apertures 70 through which a cooling gas flow 72 passes from the first cavity 52 to the second cavity 54. The aperture 70 is one of an array of circumferentially spaced apart apertures defined through the drive arm 44.

The present invention relates to the seal 60 comprising a flow control feature 74 that extends over at least a portion of the aperture 70 to deflect at least a part of the gas flow 70 towards the turbine rotor 30, as shown by the solid arrows 76. In a conventional turbine arrangement there is no flow control feature 74 and the gas flow regime within the second cavity 54 creates several disadvantages. Without the flow control feature 74 each gas flow 72 forms a jet which causes adverse discrete flow regimes within the second cavity 54. These discrete flows or jets shown by dashed arrows 80 lead to regions of differing pressure around the circumference of the second cavity 54 and it has been found that working gas 34 can enter the second cavity 54 from between the rotor blade 36 and stator vane 48, particularly in the lower pressured regions away from the discrete jets. This ingestion of relatively hot working gases degrades the effectiveness of the cooling air flow 72 meaning that increased amounts are required to ensure against such ingestion. This also has a detrimental effect to the efficiency of the gas turbine engine. Relatively hot gases ingested into the second cavity 54 tend to impinge on the rotor 30 which can adversely reduce the life of the components. Furthermore, in certain circumstances or if the seal 60 wears, a significant proportion of the cooling gas flow 72 can adversely pass through the seal 60 as shown by arrow 78 and enter the third cavity 56. Again this is wasteful and further exacerbates ingestion of working gas 34.

Referring again to the present invention, the flow control feature 74 is preferably part of the rotating part 62 of the seal 60. As it is subject to high centrifugal forces it is preferable that the flow control feature 74 is annular so that it can carry hoop stresses. Where the flow control feature 74 is rotating in juxtaposition the aperture 70 it is possible to have an annular array of discrete flow control feature 74.

The flow control feature 74 comprises an angled surface 82 upon which the gas flow 72 impinges. The flow control feature 74 advantageously achieves four objectives. Firstly, the impact of the gas flow 72 on the surface 82 causes it to spread out, particularly in the circumferential direction thereby equalizing the pressure distribution about the annular second cavity 54.

Secondly, the flow control feature 74 imparts a generally axial component of velocity to the gas flow shown by arrow 76 next to the surface 82. This axial velocity component ensures that the cooling airflow impinges on the seal plate 42 and other rotor regions advantageously cooling them to a greater extent than previously.

Thirdly, the cooling flow 76 impinges on the rotating seal plate 42 and such rotation causes the cooling air to be pumped radially outwardly. This creates recirculation within the second cavity 54 as shown by arrow 77. Any working hot gas flow 34 ingested is urged away from the turbine rotor 30, by the flow of cooling gas 76 passing along the seal plate 42, and into the recirculation 77 where it is diluted and its adverse effects are greatly nullified.

Fourthly, the cooling air is deflected away from the seal 60 so that there is less immediate loss through the seal 60. It is preferable for the cooling gas to circulate in the second cavity 54 before entering the third cavity 56 through the seal.

Although the angle $\alpha$ of the surface 82 is set by the particular geometry of each turbine, in this case the angle $\alpha$ of the surface 82, from the axis 11 (or parallel line 11' in FIG. 2A), is about 30 degrees, but could be between 15 and 45 degrees.

Changing the direction of the generally radial air flow 72 into a partially axial 11 direction (arrow 76) may be further enhanced by the surface 82 being arcuate 82'. The arcuate surface 82' is 'angled' by virtue of one end 83 being radially inwardly of its other end 84.

It should be noted it is important that the surface 82 is angled rather than the whole of the flow control feature 74, although of course as shown the flow control feature 74 itself may be angled.

In another embodiment of the present invention the flow control feature 74 extends axially forward to abut the rotor 30 and may comprise a castellated edge to allow cooling gas to exit adjacent the rotor 30.

Although described with reference to a turbine rotor assembly, the present invention may also be applicable to a compressor rotor assembly.

What is claimed is:

1. A gas turbine engine comprising:

a rotor and a stator which define first, second, and third cavities;

the rotor having an aperture directing a gas jet radially outward from the first cavity to the second cavity;

a seal configured between said rotor and stator for providing a sealing between the second and third cavities; and a seal flow control feature that extends axially over at least a portion of the aperture to deflect at least a part of the radially outward flowing gas jet axially towards the rotor.

2. A gas turbine engine as claimed in claim 1 wherein the seal further comprises a rotating part and a static part.

3. A gas turbine engine as claimed in claim 2 wherein the rotating part comprises the flow control feature.

4. A gas turbine engine as claimed in claim 2 wherein the static part further comprises the flow control feature.

5. A gas turbine engine as claimed in claim 1 wherein the flow control feature is annular.

6. A gas turbine engine as claimed in claim 1 wherein the flow control feature further comprises an angled surface, relative to the axis, upon which the gas impinges.

7. A gas turbine engine as claimed in claim 6 wherein the angle of the surface is between 15 and 45 degrees.

8. A gas turbine engine as claimed in claim 6 wherein the angle of the surface is about 30 degrees.

9. A gas turbine engine as claimed in claim 6 wherein the surface is arcuate.

10. A gas turbine engine as claimed in claim 1 wherein the gas passes through the aperture in a radial direction and the flow control feature is arranged to impart an axial component of velocity to the gas flow.

11. A gas turbine engine as claimed in claim 1 wherein the rotor further comprises a seal plate to which the deflected gases flow is directed.

12. A gas turbine engine as claimed in claim 1 wherein the rotor further comprises a drive arm that defines an annular array of apertures.

13. A gas turbine engine comprising:

a rotor and a stator which define first, second, and third cavities;

the rotor having a plurality of radially-opening apertures each directing a gas flow radially outward from the first cavity to the second cavity;

a seal configured between said rotor and stator for providing a sealing between the second and third cavities; and at least one seal flow control feature that extends axially over at least a portion of at least one of the plurality of apertures to deflect at least a part of the corresponding radially outward flowing gas axially towards the rotor.

14. A gas turbine as claimed in claim 13, wherein each of the at least one seal flow control feature corresponds to one of the plurality of apertures.

15. A gas turbine as claimed in claim 13, wherein the plurality of apertures are disposed in annular array.

* * * * *